US011390732B2

(12) United States Patent
Van Houcke et al.

(10) Patent No.: US 11,390,732 B2
(45) Date of Patent: Jul. 19, 2022

(54) POLYPROPYLENE COMPOSITION

(71) Applicants: ABU DHABI POLYMERS CO. LTD (BOROUGE) LLC., Abu Dhabi (AE); BOREALIS AG, Vienna (AT)

(72) Inventors: Daniel Van Houcke, Abu Dhabi (AE); Rana Qudaih, Abu Dhabi (AE)

(73) Assignees: ABU DHABI POLYMERS CO. LTD (BOROUGE) LLC., Abu Dhabi (AE); BOREALIS AG, Vienna (AT)

(*) Notice: Subject to any disclaimer, the term of this patent is extended or adjusted under 35 U.S.C. 154(b) by 239 days.

(21) Appl. No.: 16/652,115

(22) PCT Filed: Oct. 18, 2018

(86) PCT No.: PCT/EP2018/078551
§ 371 (c)(1),
(2) Date: Mar. 30, 2020

(87) PCT Pub. No.: WO2019/077043
PCT Pub. Date: Apr. 25, 2019

(65) Prior Publication Data
US 2020/0270434 A1 Aug. 27, 2020

(30) Foreign Application Priority Data
Oct. 19, 2017 (EP) .................... 17197338

(51) Int. Cl.
*C08L 23/12* (2006.01)
*B29C 55/12* (2006.01)
*C08L 23/14* (2006.01)

(52) U.S. Cl.
CPC .............. *C08L 23/12* (2013.01); *B29C 55/12* (2013.01); *C08L 23/14* (2013.01); *C08L 2203/12* (2013.01); *C08L 2203/16* (2013.01); *C08L 2205/025* (2013.01)

(58) Field of Classification Search
CPC ..... C08L 23/14; C08L 23/12; C08L 2205/025
See application file for complete search history.

(56) References Cited

U.S. PATENT DOCUMENTS

| | | | |
|---|---|---|---|
| 3,412,078 A | 11/1968 | Hagemeyer, Jr. et al. | |
| 4,107,414 A | 8/1978 | Giannini et al. | |
| 4,186,107 A | 1/1980 | Wagner | |
| 4,186,240 A | 1/1980 | Iwata et al. | |
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,539,067 A | 7/1996 | Parodi et al. | |
| 5,618,771 A | 4/1997 | Parodi et al. | |
| 6,071,598 A * | 6/2000 | Peiffer .................... B32B 27/18 428/213 |
| 6,177,377 B1 | 1/2001 | Chien | |
| 6,635,715 B1 | 10/2003 | Datta et al. | |
| 8,957,159 B2 | 2/2015 | Jiang et al. | |
| 2006/0094826 A1* | 5/2006 | Datta ....................... C08L 23/10 525/240 |
| 2006/0202377 A1* | 9/2006 | Gownder .................. D01F 6/06 264/165 |
| 2007/0251572 A1* | 11/2007 | Hoya ...................... B32B 27/32 136/256 |
| 2016/0059514 A1* | 3/2016 | Perick ..................... B32B 27/32 428/152 |
| 2018/0155538 A1* | 6/2018 | Cheng ..................... B32B 25/10 |

FOREIGN PATENT DOCUMENTS

| | | |
|---|---|---|
| CN | 1265693 A | 9/2000 |
| EP | 0 045 975 B1 | 4/1989 |
| EP | 0 045 976 B1 | 11/1989 |
| EP | 0 045 977 B2 | 3/1995 |
| EP | 0 887 379 A1 | 12/1998 |
| EP | 0 887 380 A1 | 12/1998 |
| EP | 0 887 381 A1 | 12/1998 |
| EP | 0 991 684 B1 | 1/2006 |
| EP | 2 610 271 A1 | 7/2013 |

(Continued)

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.*. 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Cheng, "$^{13}$C NMR Analysis of Ethylene-Propylene Rubbers," *Macromolecules* 17:1950-1955 (1984).
Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules* 15:1150-1152 (1982).
Minami et al., "Development of low isotactic polyolefin," *Polymer Journal* 47: 227-234 (2015).

(Continued)

*Primary Examiner* — Jeffrey C Mullis
(74) *Attorney, Agent, or Firm* — Leydig, Voit & Mayer, Ltd.

(57) ABSTRACT

The present invention is directed to a polypropylene composition (C) comprising abase polymer being a first polypropylene (PP1) and a second polypropylene (PP2). The present invention is further directed to a film and a fiber comprising said polypropylene composition (C).

14 Claims, No Drawings

(56) References Cited

FOREIGN PATENT DOCUMENTS

| WO | WO 87/07620 A1 | 12/1987 |
|---|---|---|
| WO | WO 92/12182 A1 | 7/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 95/32994 A1 | 12/1995 |
| WO | WO 96/20225 A2 | 7/1996 |
| WO | WO 97/36939 A1 | 10/1997 |
| WO | WO 98/12234 A1 | 3/1998 |
| WO | WO 99/24478 A1 | 5/1999 |
| WO | WO 99/24479 A1 | 5/1999 |
| WO | WO 99/33842 A1 | 7/1999 |
| WO | WO 00/68315 A1 | 11/2000 |
| WO | WO 03/00754 A1 | 1/2003 |
| WO | WO 03/00755 A2 | 1/2003 |
| WO | WO 03/00756 A1 | 1/2003 |
| WO | WO 03/00757 A1 | 1/2003 |
| WO | WO 2004/000899 A1 | 12/2003 |
| WO | WO 2004/029112 A1 | 4/2004 |
| WO | WO 2004/111095 A1 | 12/2004 |
| WO | WO 2007/137853 A1 | 12/2007 |
| WO | WO 2012/007430 A1 | 1/2012 |

OTHER PUBLICATIONS

*Plastics Additives Handbook*, 6th edition, Hans Zweifel, Editor, Hanser Publishers, Munich, pp. 1141-1190 (2009).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers-application of quantitative $^{13}$C NMR," *Polymer Testing* 28(5):475-479 (2009).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, Extended European Search Report in European Patent Application No. 17197338.1 (Apr. 6, 2018).

European Patent Office, International Search Report in International Application No. PCT/EP2018/078551 (dated Dec. 12, 2018).

European Patent Office, Written Opinion in International Application No. PCT/EP2018/078551 (dated Dec. 12, 2018).

International Bureau of WIPO, International Preliminary Report on Patentability in International Application No. PCT/EP2018/078551 dated Apr. 21, 2020).

China National Intellectual Property Administration, First Office Action in Chinese Patent Application No. 201880063125.5 (dated Feb. 11, 2022).

* cited by examiner ics of fibers of the polypropylene composition (C). Furthermore, with the polypropylene composition (C) any plate-out and/or fumes can preferably be decreased or avoided.

POLYPROPYLENE COMPOSITION

CROSS-REFERENCE TO A RELATED APPLICATION

This patent application is the U.S. national phase of International Application No. PCT/EP2018/078551, filed on Oct. 18, 2018, the disclosure of which is incorporated herein in its entirety for all purposes.

The present invention is directed to a polypropylene composition (C) comprising a base polymer being a first polypropylene (PP1) and a second polypropylene (PP2). The present invention is further directed to a film and a fiber comprising said polypropylene composition (C).

Polypropylene materials are widely used in the field of packaging films. In particular, biaxially oriented polypropylene films are used in a wide range of technical application such as packaging, tapes or capacitor films. Desired properties of such films are high stiffness accompanied by a good thermal resistance. At the same time, the film should have beneficial processing properties. In particular, the biaxially oriented film should be obtainable at high draw ratios and low drawing temperatures without the occurrence of film breaking. In the field of fibers, like spunbonded fibers, polypropylenes are also often the material of choice. For instance in the spunbonding process, good processing properties of the material are also of high importance.

One approach to improve the processability is the application of polypropylene materials containing irregularities in the polymer chain such as comonomers or domains with lower stereo regularity. Increasing the xylene soluble content also results in better processing properties of a polypropylene material. However, such modifications usually have a negative effect on the stiffness.

Thus, there is a need in the art for a polypropylene material featured by an improved processability for stretching and/or spinning applications accompanied by excellent mechanical properties.

The present invention is directed to a polypropylene composition (C), comprising i) 80.0 to 99.5 wt.-%, based on the overall weight of the polypropylene composition (C), of a first polypropylene (PP1), and ii) 0.5 to 20.0 wt.-%, based on the overall weight of the polypropylene composition (C), of a second polypropylene (PP2) which is different from the first polypropylene (PP1) and has a melting temperature Tm of 130° C. or less, wherein said first polypropylene (PP1) fulfills in-equation (I)

$$C7(PP1)-C6(PP1) \leq 1.5 \quad (I)$$

wherein

C7(PP1) is the amount of heptane solubles [in wt.-%], preferably when measured from the first polypropylene (PP1) as described under "1. Measuring methods", and C6(PP1) is the amount of hexane solubles [in wt.-%], preferably when measured from the first polypropylene (PP1) as described under "1. Measuring methods".

The measurement method as described under "1. Measuring methods" for determining the amount of heptane solubles (C7) and, respectively, of hexane solubles (C6) is the preferred measurement method.

The rather low value of 1.5 or less as a result of the in-equation (I) indicates poor stretchability/spinnability behavior.

Surprisingly, the claimed relationship between heptane solubles and hexane solubles of the first polypropylene (PP1), combined with the claimed second polypropylene (PP2) with low melting temperature, results in a polypropylene composition (C) with excellent stretching and spinnability properties. Moreover, the polypropylene composition (C) has preferably excellent processing properties. For instance the polypropylene composition (C) can preferably be processed with high shear rates.

In other words, the claimed first polypropylene (PP1) as such is typically not suitable or has limited suitability for stretching. By combining said claimed first polypropylene (PP1) with the claimed second polypropylene (PP2), however, a polypropylene composition (C) having excellent stretching and spinning properties and also processing performance is obtained which enables to produce e.g. films, preferably biaxially oriented films (BOPP), or fibers of the polypropylene composition (C) at high line speed, i.e. at high production throughput.

Accordingly, the combination of the first polypropylene (PP1) and the second polypropylene (PP2) preferably improves processability without the need to increase the xylene soluble content (XCS) and/or comonomer content, like ethylene content, of the first polypropylene (PP1). This approach is often applied in the prior art, e.g. for film and fiber applications, when using preferably crystalline propylene polymers having a low xylene soluble content (XCS) such as the first polypropylene (PP1) alone, to enable achieving stretchability/spinning properties together with industrially feasible production speed.

The polypropylene composition (C) of the invention can preferably be used in applications where the polymer composition is facing high shear rates in melt and/or in solid state. Moreover, the polymer composition (C) of the invention is highly suitable for applications where stretchability is required in melt and/or solid state.

Furthermore, with the polypropylene composition (C) any plate-out and/or fumes can preferably be decreased or avoided.

Accordingly, the composition (C) of the invention has very good stretchability and spinnability properties, thereby making it very suitable for film and fiber applications, like biaxially oriented film (BOPP) and fiber applications, preferably melt spun fiber applications, like spunbonded fiber applications.

According to one embodiment of the present invention, the polypropylene composition (C) fulfills in-equation (II)

$$1.5 < [C7(C)-C6(C)] \leq 5.0 \quad (II)$$

wherein

C7(C) is the amount of heptane solubles [in wt.-%], preferably when measured from the polypropylene composition (C) as described under "1. Measuring methods", and C6(C) is the amount of hexane solubles [in wt.-%], preferably when measured from the polypropylene composition (C) as described under "1. Measuring methods".

The measurement method as described under "1. Measuring methods" for determining the amount of heptane solubles (C7) and, respectively, of hexane solubles (C6) is the preferred measurement method.

The preferable relationship between heptane solubles and hexane solubles of the polypropylene composition (C) preferably further contributes to the excellent stretching/spinning property at high line speeds.

According to still another embodiment of the present invention, the polypropylene composition (C) has a xylene soluble content (XCS) below 10.0 wt.-%, preferably from 1.0 to below 10.0, preferably 1.5 to below 10.0, preferably 2.0 to below 10.0, wt.-%. The skilled person can choose the XCS of the first and second polypropylene components (PP1) and (PP2) accordingly.

The present invention is further directed to an article comprising the polypropylene composition (C) as described above.

According to one embodiment of the present invention, said article is a film, preferably a biaxially oriented (BOPP) film.

According to another embodiment of the present invention, said article is a fiber, preferably a melt spun fiber, more preferably to a spunbonded fiber.

In the following, the present invention is described in more detail.

The Polypropylene Composition (C)

The inventive polypropylene composition (C) comprises a polypropylene base polymer (PP1) and the second polypropylene (PP2). The second polypropylene (PP2) preferably functions as a processing aid.

Accordingly, the inventive polypropylene composition (C) preferably comprises 80.0 to 99.5 wt.-%, preferably 80.0 to 98.0 wt.-%, more preferably 85.0 to 97.0 wt.-%, still more preferably 88.0 to 97.0 wt.-%, of the first polypropylene (PP1) and 0.5 to 20.0 wt.-%, preferably 2.0 to 20.0 wt.-%, more preferably 3.0 to 15.0 wt.-%, still more preferably 3.0 to 12.0 wt.-% of the second polypropylene (PP2), based on the overall weight of the polypropylene (C).

Preferably, the polypropylene composition (C) fulfills in-equation (II), more preferably in-equation (IIa), still more preferably in-equation (IIb)

$$1.5 < [C7(C) - C6(C)] \leq 5.0 \quad (II)$$

$$1.6 \leq [C7(C) - C6(C)] \leq 4.5 \quad (IIa)$$

$$1.7 \leq [C7(C) - C6(C)] \leq 4.2 \quad (IIb)$$

wherein

C7(C) is the amount of heptane solubles [in wt.-%] in the polypropylene composition (C), preferably when measured as described below under "1. Measuring methods", and C6(C) is the amount of hexane solubles [in wt.-%] in the polypropylene composition (C), preferably when measured as described below under "1. Measuring methods".

The polypropylene composition (C) of the present invention may include additives (AD). Accordingly, it is preferred that the inventive polypropylene composition (C) comprises, more preferably consists of, 80.0 to 99.5 wt.-%, preferably 80.0 to 97.95 wt.-%, more preferably 85.0 to 96.0 wt.-%, still more preferably 88.0 to 96.0 wt.-%, of the first polypropylene (PP1) and 0.5 to 20.0 wt.-%, preferably 2.0 to 20.0 wt.-%, more preferably 3.0 to 15.0 wt.-%, still more preferably 3.0 to 12.0 wt.-% of the second polypropylene (PP2), and 0.0 to 5.0 wt.-%, more preferably 0.05 to 4.0 wt.-%, still more preferably 0.1 to 3.0 wt.-% of additives (AD), based on the overall weight of the polypropylene composition (C). The additives (AD) are described in more detail below. The amounts of the components total up to 100 wt.-% of the inventive polypropylene composition (C).

Preferably the polypropylene composition (C) of the invention does not comprise (a) further polymeric material different to the first polypropylene (PP1) and the second polypropylene (PP2) in an amount exceeding 5.0 wt.-%, preferably in an amount exceeding 3.0 wt.-%, more preferably in an amount exceeding 2.5 wt.-%, based on the overall weight of the polypropylene composition (C).

Accordingly, it is preferred that the polymeric material of the polypropylene composition (C) consists of the first polypropylene (PP1) and the second polypropylene (PP2).

In one embodiment the polypropylene composition (C) according to the present invention comprises the first polypropylene (PP1) and the second polypropylene (PP2) in a weight ratio from 80:20 to 99.5:0.5, more preferably in a weight ratio from 85:15 to 97:3, still more preferably in a weight ratio from 88:12 to 97:3.

The MFR of the polypropylene composition (C) depends on the desired final end application and can be adjusted with MFR values of the components (PP1) and (PP2), as known for a skilled person. Preferably the polypropylene composition (C) has a melt flow rate $MFR_2$ (230° C., 2.16 kg) determined according to ISO 1133 in the range of 0.1 to 100 g/10 min, more preferably in the range of 1.0 to 80 g/10 min, still more preferably in the range of 1.5 to 50 g/10 min.

Further, the polypropylene composition (C) preferably has a melting temperature of at least 140° C., more preferably in the range of 140 to 170° C., still more preferably in the range of 145 to 168° C., like in the range of 150 to 165° C.

The overall comonomer content, if comonomers are present, of the inventive polypropylene composition (C) is also preferably rather low. In particular, it is preferred that the polypropylene composition (C) has a comonomer content in the range of 0.0 to 5.0 mol-%, more preferably in the range of 0.01 to 3.0 mol-%, still more preferably in a range of 0.1 to 2.0 mol-%, like in a range of 0.2 to 1.0 mol-%.

In one preferable embodiment the comonomer is ethylene (C2) and the overall C2-comonomer content of the inventive polypropylene composition (C) is 0.01 to 5.0 wt-%, preferably 0.1 to 4.0 wt-%, preferably 0.15 to 0.35 wt-%, preferably 0.15 to 0.3 wt-%, preferably 0.15 to 0.25 wt-% based on the total weight (100 wt-%) of the polypropylene composition (C).

As to preferable end applications of the polymer composition (C) of the invention, the processability of the polymer composition (C) of the invention is highly feasible for various film end applications, preferably for biaxial oriented (BOPP) film applications. For instance the polymer composition (C) contributes to biaxial orientation of the BOPP film. Moreover, the polymer composition (C) of the invention is preferably highly feasible for various fiber end applications based on producing the fibers from the polymer composition (C) using any conventional technics, like melt spinning (e.g. multifilaments) of the fiber and thus contributes to the final properties linked to the drawing, cooling etc.

The processability preferably contributes to the final properties, like the final crystallinity and/or orientation of the polymer, hence preferably on the final mechanical properties, like stiffness. Moreover, the processability improvement achieved with the polymer composition (C) of the invention does not reflect only to mechanical properties, but preferably also to good thickness uniformity of the film or the fiber of the polymer composition (C) of the invention.

Preferably, the polypropylene composition (C) according to the present invention is obtained by melt blending the first polypropylene (PP1) and the second polypropylene (PP2) together with optional additives in a ratio as outlined above. The blending is typically carried out as meltmixing in a mixer at elevated temperature above the softening temperature of the polymer component(s) using conventional, e.g. commercially available, mixing equipment, like extruder. The meltmixing and the mixing equipment are well known and documented in the literature. Moreover, the polypropylene composition (C) can be produced e.g. before supplying it to the article convertor or during the production of an article. The mixing conditions and equipment can be chosen by a skilled person.

In the following, the first polypropylene (PP1) and the second polypropylene (PP2) are described in more detail.

The First Polypropylene (PP1)

The first polypropylene (PP 1) is the major component of the inventive polypropylene composition (C).

The first polypropylene (PP1) can be a propylene copolymer or a propylene homopolymer. Preferably the first polypropylene (PP1) is a propylene homopolymer.

In case the first polypropylene (PP1) is a propylene copolymer, the first polypropylene (PP1) comprises propylene and comonomers copolymerised with propylene, for example comonomers such as ethylene and/or $C_4$ to $C_{10}$ α-olefins, in particular ethylene and/or $C_4$ to $C_8$ α-olefins, in particular ethylene and/or $C_4$ to $C_6$ α-olefins, e.g. 1-butene and/or 1-hexene. In case the first polypropylene (PP1) is a propylene copolymer, then preferably the first polypropylene (PP1) according to this invention comprises, especially consists of, propylene and comonomers copolymerised with propylene from the group consisting of ethylene, 1-butene and 1-hexene, preferably of ethylene.

Further, in case the first polypropylene (PP1) is a propylene copolymer, the first polypropylene (PP1) is most preferably a random propylene copolymer (R-PP1). The term "random" indicates that the comonomer of the random propylene copolymer (R-PP1) is randomly distributed within the copolymer of propylene. The term random is understood according to IUPAC (Glossary of basic terms in polymer science; IUPAC recommendations 1996). Thereby, a random copolymer of propylene includes a fraction, which is insoluble in xylene, i.e. xylene cold insoluble (XCU) fraction, preferably when measured as defined below under "1. Measuring methods", in an amount of at least 80 wt.-%, still more preferably of at least 85 wt.-% and most preferably of at least 90 wt.-%, based on the total amount of the random copolymer of propylene.

As known for a skilled person, a random copolymer is different from heterophasic polypropylene. Generally, a heterophasic polypropylene is a propylene copolymer comprising a propylene homo- or random copolymer matrix component (1) and an elastomeric copolymer component (2) of propylene with one or more of ethylene and $C_4$-$C_8$-olefin comonomers, wherein the elastomeric (amorphous) copolymer component (2) is dispersed in said propylene homo- or random copolymer matrix polymer (1). The presence of an elastomeric phase or of the so-called inclusions is for instance visible by high resolution microscopy, like electron microscopy or atomic force microscopy, or by dynamic mechanical thermal analysis (DMTA). A random copolymer does not contain an elastomeric polymer phase dispersed therein.

Thereby, the term "random copolymer of propylene" according to the present invention excludes heterophasic systems. In other words, the first polypropylene (PP1), like the random propylene copolymer (R-PP1) or the propylene homopolymer (H-PP1), does not comprise an elastomeric phase, i.e. is monophasic.

According to one embodiment of the present invention, the first polypropylene (PP 1) has preferably a comonomer content equal or below 10.0 mol-%. The comonomer content of the first polypropylene (PP1) is preferably in the range of 0.0 to 5.0 mol-%, yet more preferably in the range of 0.0 to 3.0 mol-%, still more preferably in the range of 0.0 to 1.0 mol-%.

In case of the random propylene copolymer (R-PP1) the comonomer content, like the ethylene content, is preferably in the range of 0.6 to 5.0 mol-%, yet more preferably in the range of 0.8 to 3.0 mol-%, still more preferably in the range of 0.8 to 1.5 mol-%.

It is especially preferred that the first polypropylene (PP1) is a propylene homopolymer (H-PP1).

According to the present invention the expression "propylene homopolymer" relates to a polypropylene that consists substantially, i.e. of at least 99.4 mol-%, more preferably of at least 99.6 mol-%, still more preferably of at least 99.7 mol-%, like of at least 99.9 mol-%, of propylene units. In another embodiment only propylene units are detectable, i.e. only propylene has been polymerized. The definition "propylene homopolymer" has a well known meaning in the art.

It is preferred that the first polypropylene (PP1) has a melt flow rate $MFR_2$ (230° C., 2.16 kg) determined according to ISO 1133 in the range of 0.1 to below 50 g/10 min, more preferably in the range of 1.0 to 45 g/10 min, still more preferably in the range of 1.0 to 40 g/10 min.

According to one embodiment of the present invention, the first polypropylene (PP1) has a rather low melt flow rate $MFR_2$ (230° C., 2.16 kg) determined according to ISO 1133 in a range of 0.1 to 6.0 g/10 min, more preferably in a range of 1.0 to 4.0 g/10 min, still more preferably in a range of 3.0 to 3.8 g/10 min. The melt flow rate $MFR_2$ provided in this paragraph is especially suitable for films, like biaxially oriented polypropylene films (BOPP).

It is preferred that the first polypropylene (PP1), like the preferable propylene homopolymer (H-PP1), is featured by rather low cold xylene soluble (XCS) content, i.e. by a xylene cold soluble (XCS) below 3.1 wt.-% Accordingly, the first polypropylene (PP1), like the first propylene homopolymer (H-PP1), has preferably a xylene cold soluble content (XCS) in the range of 0.5 to 3.0 wt.-%, more preferably in the range of 0.5 to 2.5wt.-%, still more preferably in the range of 0.7 to 2.0 wt.-%.

The amount of xylene cold solubles (XCS) additionally indicates that the first polypropylene (PP1), like the propylene homopolymer (H-PP1), is preferably free of any elastomeric polymer component, like an ethylene propylene rubber. In other words, the first polypropylene (PP1), like the propylene homopolymer (H-PP1), shall be not a heterophasic polypropylene, i.e. a system consisting of a polypropylene matrix in which an elastomeric phase is dispersed. Such systems are featured by a rather high xylene cold soluble content. In other words, the first polypropylene (PP1) according to the instant invention is a monophasic polypropylene.

Further, the first polypropylene (PP1), preferably the propylene homopolymer (H-PP1), is preferably a crystalline propylene homopolymer. The term "crystalline" indicates that the first polypropylene (PP1), like the propylene homopolymer (H-PP1), has a rather high melting temperature. Accordingly throughout the invention the first polypropylene (PP1), like the propylene homopolymer (H-PP1), is regarded as crystalline unless otherwise indicated. The first polypropylene (PP1), preferably the propylene homopolymer (H-PP1), preferably has a melting temperature Tm measured by differential scanning calorimetry (DSC) higher than the melting temperature of the second polypropylene (PP2). In particular it is preferred that the first polypropylene (PP1), preferably the propylene homopolymer (H-PP1), has a melting temperature Tm above 150° C., more preferably of at least 160° C., still more preferably at least 160° C., like in the range of 160° C. to 167° C.

Further it is preferred that the first polypropylene (PP1), preferably the propylene homopolymer (H-PP1), has a crystallization temperature Tc measured by differential scanning calorimetry (DSC) of equal or more than 100° C., more preferably in the range of 100 to 130° C.

The first polypropylene (PP1), preferably the propylene homopolymer (H-PP1), is preferably featured by high stiffness. Accordingly the first polypropylene (PP1), preferably the propylene homopolymer (H-PP1), preferably has a rather high tensile modulus in machine direction (MD). Accordingly it is preferred that the first polypropylene (PP1), like the first propylene homopolymer (H-PP1), has a tensile modulus in machine direction (MD) measured at 23° C. according to ISO 527-3 using 20 μm BOPP film (cross head speed 1 mm/min) of at least 1,200 MPa, more preferably in the range of 1,200 to 2,500 MPa.

The first polypropylene (PP1) of the present invention may contain suitable additives as known in the art. According to this invention, the additives of the first polypropylene (PP1) are regarded being part of the "additives (AD)" as described in more detail in the below section "The Additives".

The first polypropylene (PP1) can be commercially available product or can be produced e.g. by conventional polymerization processes and process conditions using e.g. the conventional catalyst system, like Ziegler-Natta catalyst or single site catalyst, including metallocene catalyst, preferably Ziegler-Natta catalyst, which have a well-known meaning and which are well described in the literature.

In case the first polypropylene (PP1) according to this invention is produced e.g. by conventional polymerization process, preferably produced in the presence of
(a) a Ziegler-Natta catalyst (ZN) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

The following polymerization description is given as a suitable example for producing the first polypropylene (PP1) and applies for the preferable random or homo polymer of the first polypropylene (PP1). The first polypropylene (PP1) can be produced in one reactor (R1) or in a sequential polymerization process as further described below comprising at least two reactors (R1) and (R2), in the first reactor (R1) a first propylene homopolymer fraction or first random propylene copolymer fraction is produced and subsequently transferred into the second reactor (R2), in the second reactor (R2) a second propylene homopolymer fraction or second random propylene copolymer fraction is produced in the presence of the first propylene homopolymer fraction or first random propylene copolymer fraction, respectively.

The term "sequential polymerization system" indicates that the first polypropylene (PP1) is produced in at least two reactors connected in series. Accordingly, the present polymerization system may comprise at least a first polymerization reactor (R1) and a second polymerization reactor (R2).

In case the process consists of one or two polymerization reactors, this definition does not exclude the option that the overall system comprises for instance a pre-polymerization step in a pre-polymerization reactor. The term "consist of" is only a closing formulation in view of the main polymerization reactors.

In case the process consists of two polymerization reactors, at least one of the two polymerization reactors (R1) and (R2) is preferably a gas phase reactor (GPR). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

Preferably the polymer fraction of the first polymerization reactor (R1), e.g. the first propylene homopolymer fraction, more preferably the polymer slurry of the loop reactor (LR) containing the first polymer fraction, is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR), the polymer slurry comprising the first polymer fraction, like the first propylene homopolymer fraction, is led directly to the next stage gas phase reactor.

Alternatively, the polymer fraction of the first polymerization reactor (R1), e.g. the first propylene homopolymer fraction, more preferably polymer slurry of the loop reactor (LR) containing the first polymer fraction, may be also directed into a flash step or through a further concentration step before fed into the second polymerization reactor (R2), i.e. into the gas phase reactor (GPR). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

Thus, in a preferred embodiment the first polymerization reactor (R1) is a slurry reactor (SR), like loop reactor (LR), whereas the second polymerization reactor (R2) and any optional subsequent reactor, like the third polymerization reactor (R3), are gas phase reactors (GPRs). All reactors are connected in series. If needed prior to the slurry reactor (SR) a pre-polymerization reactor is placed.

The Ziegler-Natta catalyst (ZN) is fed into the first polymerization reactor (R1) and is transferred with the polymer (slurry) obtained in the first polymerization reactor (R1) into the subsequent reactors. If the process covers also a pre-polymerization step it is preferred that all of the Ziegler-Natta catalyst (ZN) s fed in the pre-polymerization reactor. Subsequently the pre-polymerization product containing the Ziegler-Natty catalyst (ZN) is transferred into the first polymerization reactor (R1).

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Base11. Accordingly it is preferred that the operating temperature in the first polymerization reactor (R1) is in the range of 62 to 85° C. and can be chosen by a skilled person.

Preferably the operating temperature in the second polymerization reactor (R2), if present, is equal to or higher than the operating temperature in the first polymerization reactor (R1). Accordingly it is preferred that the operating temperature in the first polymerization reactor (R1) is in the range of 62 to 85° C. and can be chosen by a skilled person.

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), if present, i.e. in the (first) gas phase reactor (GPR1).

Preferably hydrogen is added in each polymerization reactor in order to control the molecular weight, i.e. the melt flow rate $MFR_2$.

As mentioned above the preparation of the first polypropylene (PP1) can comprise in addition to the (main) polymerization of the first polypropylene (PP1) in the one or two polymerization reactors (R1 and R2) prior thereto a pre-polymerization in a pre-polymerization reactor (PR) upstream to the first polymerization reactor (R1). If a pre-polymerization is used, subsequent to said pre-polymerization, the mixture (MI) of the Ziegler-Natta catalyst (ZN) and the polypropylene (Pre-PP) produced in the pre-polymerization reactor (PR) is transferred to the first reactor (R1).

The amount of any prepolymer is very low based on the amount of the polypropylene composition (C) and is counted to the amount of the first polymerization reactor (R1).

The pre-polymerization reaction is typically conducted at a temperature of 0 to 60° C., preferably from 15 to 50° C., and more preferably from 20 to 45° C.

The pressure in the pre-polymerization reactor is preferably from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore an ethylene feed may be employed during pre-polymerization as mentioned above.

In case that pre-polymerization is not used, propylene and the other ingredients such as the Ziegler-Natta catalyst (ZN) are directly introduced into the first polymerization reactor (R1).

Accordingly, the propylene homopolymer or the random propylene copolymer is preferably produced in a process comprising the following steps under the conditions set out above (a) in the first polymerization reactor (R1), i.e. in a loop reactor (LR) or a gas phase reactor (GPR), propylene and optionally comonomer(s) is/are polymerized obtaining a first propylene polymer fraction of the first polypropylene (PP1), (b) optionally transferring said first propylene polymer fraction to a second polymerization reactor (R2), said second polymerization reactor (R2) preferably being a gas phase reactor (GPR), (c) in the optional second polymerization reactor (R2) propylene and optionally comonomer(s) is/are polymerized in the presence of the first propylene polymer fraction obtaining a second propylene polymer fraction of the polypropylene (PP1), said first propylene polymer fraction and optionally said second propylene polymer fraction form the polypropylene (PP1).

A pre-polymerization as described above can be accomplished prior to step (a).

A Ziegler-Natta type catalyst typically used in the present invention for propylene polymerization is stereospecific, solid high yield Ziegler-Natta catalyst component comprising as essential components Mg, Ti and Cl. In addition to the solid catalyst a cocatalyst(s) as well external donor(s) are typically used in polymerisation process.

Components of catalyst may be supported on a particulate support, such as inorganic oxide, like silica or alumina, or, usually, the magnesium halide may form the solid support. It is also possible that catalysts components are not supported on an external support, but solid catalyst is prepared by emulsion-solidification method or by precipitation method.

The solid catalyst usually also comprises an electron donor (internal electron donor) and optionally aluminum. Suitable internal electron donors are, among others, esters of carboxylic acids or dicarboxylic acids, like phthalates, maleates, substituted maleates, benzoates, and succinates, 1,3-diethers or oxygen or nitrogen containing silicon compounds, or mixtures thereof.

The cocatalyst typically comprises an aluminum alkyl compound. The aluminum alkyl compound is preferably trialkyl aluminum such as trimethylaluminum, triethylaluminum, tri-isobutylaluminum or tri-n-octylaluminum. However, it may also be an alkylaluminum halide, such as diethylaluminum chloride, dimethylaluminum chloride or ethylaluminum sesquichloride.

Suitable external electron donors used in polymerization are well known in the art and include ethers, ketones, amines, alcohols, phenols, phosphines and silanes. Silane type external donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

Especially useful solid catalysts are those disclosed in WO-A-2003/000757, WO-A-2003/000754, WO-A-2004/029112 and WO2007/137853.

Typically the first polypropylene (PP1) can be a polypropylene known in the art. Preferable non-limiting examples of the first polypropylene (PP1) are for instance commercial propylene homopolymers HC401BF by Borouge, HC402BF by Borouge or HH450FB by Borealis or Borouge.

It is especially preferred that the first polypropylene (PP1) is one of the commercial propylene homopolymers HC401BF by Borouge or HC402BF by Borouge.

The Second Polypropylene (PP2)

It is preferred that the second polypropylene (PP2) has a low melting temperature. Therefore, the second polypropylene (PP2) has a melting temperature Tm measured by differential scanning calorimetry (DSC) of 130° C. or less, preferably in the range of 50 to 125° C., more preferably in the range of 55 to 120° C., still more preferably in the range of 60 to 115° C., still more preferably in the range of 75 to 110° C., still more preferably in the range of 70 to 100° C., still more preferably in the range of 70 to 90° C.

Preferably the second polypropylene (PP2) has a molecular weight distribution $M_w/M_n$ in the range of 1.0 to 5.0, preferably 1.0 to 4.0, preferably 1.8 to 3.0, still more preferably in the range of 1.8 to 2.5.

Further, it is preferred that the second polypropylene (PP2) is featured by a rather high molecular weight. Accordingly, it is preferred that the second polypropylene (PP2) has a weight molecular weight $M_w$ in the range of 20 to 300 kg/mol, more preferably in the range of 38 to 200 kg/mol, still more preferably in the range of 40 to 140 kg/mol.

The second polypropylene (PP2) has preferably a Tensile modulus determined according to ISO 527 on injection-molded specimens in the range of 50 to 500 MPa, more preferably of 60 to 400 MPa, still more preferably of 70 to 300 MPa, yet more preferably of 70 to 200 MPa, like 80 to 150 MPa.

Preferably, the second polypropylene (PP2) has a melt flow rate $MFR_2$ (230° C., 2.16 kg) determined according to ISO 1133 in the range of 30 to 3000 g/10 min, more preferably in the range of 35 to 2500 g/10 min, still more preferably in the range of 40 to 2200 g/10 min, like in the range of 45 to 2100 g/10 min, wherein $MFR_2$ values of 1000 g/10 min or above are converted from the B-viscosity (190° C.) determined according to ASTM D 3236. In one embodiment $MFR_2$ of from 45 to 2000 g/10 min, preferably of 45 to 1000 g/10 min, preferably of 45 to 900 g/10 min, preferably of 45 to 700 g/10 min, preferably of 45 to 500 g/10 min, preferably of 45 to 400 g/10 min is desired.

Preferably, the second polypropylene (PP2) has a B-Viscosity (190° C., ASTM D 3236) in the range of 5000 to 500 000 mPa·s, more preferably of 7000 to 450 000 mPa·s, still more preferably of 8000 to 450 000 mPa·s. In one embodiment the B-Viscosity is preferably in a range of 10 000 to 450 000 mPa·s, more preferably of 20 000 to 450 000 mPa·s, still more preferably of 30 000 to 450 000 mPa·s. An especially preferred range is 40 000 to 400 000 mPa·s.

Further, it is preferred that the second polypropylene (PP2) has a density below 895 kg/m³, more preferably in a range of 850 to 890 kg/m³, still more preferably in a range of 860 to 880 kg/m³, like in a range of 865 to 875 kg/m³.

The second polypropylene (PP2) is preferably not heterophasic, but is monophasic according to the definition provided above.

Accordingly, the second polypropylene (PP2) can be a propylene copolymer or a propylene homopolymer.

In case the second polypropylene (PP2) is a propylene copolymer, then comonomers copolymerizable with propylene are preferably selected from ethylene and/or $C_4$ to $C_8$ α-olefins, in particular ethylene and/or $C_4$ to $C_6$ α-olefins, preferably from the group consisting of ethylene, 1-butene and 1-hexene.

In case the second polypropylene (PP2) is a propylene copolymer, then it is preferably a random propylene copolymer (R-PP2). Regarding the terms "random" and "random copolymer", reference is made to the definition provided above with regard to the first polypropylene (PP1).

The second polypropylene (PP2) is preferably a homopolymer of polypropylene, i.e. a propylene homopolymer (H-PP2). Regarding the expression "propylene homopolymer", reference is made to the definition provided above.

The second polypropylene (PP2) of the present invention may contain suitable additives as known in the art. According to this invention, the additives of the second polypropylene (PP2) are regarded being part of the "additives (AD)" as described in more detail in the below section "The Additives".

The second polypropylene (PP2), is preferably obtained by polymerizing propylene in the presence of a metallocene catalyst. In particular, the second polypropylene (PP2) is preferably obtained by using IDEMITSU metallocene catalyst for producing commercial L-MODU™ polypropylene polymer. Suitable metallocene catalysts are described by Y. Minami et al, Polymer Journal 2015, 45, pages 227-234.

Alternatively, and preferably, the second polypropylene (PP2) is a polypropylene known in the art and commercially available or can be produced in manner as given in the literature as well known for a skilled person in the art. A suitable second polypropylene (PP2) is inter alia commercially available, e.g. one of the commercial propylene homopolymers L-MODU S400, L-MODU S600 or L-MODU S901 supplied by Idemitsu.

The Additives (AD)

The polypropylene composition (C) of the present invention may include additives (AD). The additives (AD) may be added separately to the polypropylene composition and/or are introduced as part of the first and/or second polypropylene (PP1) and (PP2).

Typical additives are acid scavengers, antioxidants, colorants, light stabilizers, plasticizers, slip agents, anti-scratch agents, dispersing agents, processing aids, lubricants, pigments, fillers, and the like.

Such additives are commercially available and for example described in "Plastic Additives Handbook", $6^{th}$ edition 2009 of Hans Zweifel (pages 1141 to 1190).

Furthermore, the term "additives (AD)" according to the present invention may also include any carrier materials, for instance polymeric carrier materials, like polymeric carrier material(s) present in optional masterbatch (MB) of an additive (AD). Accordingly the carrier material, like the polymeric carrier material, is part of the additives (AD) and not considered as a "polymeric material" as defined above.

Therefore any polymer being a carrier material for additives (AD) is calculated neither to the amount of first and second polypropylene (PP1) and (PP2) nor to the amount of "polymeric material" as indicated in the present invention, but to the amount of the respective additive (AD).

The Article

The present invention is further directed to an article comprising the polypropylene composition (C) comprising the first polypropylene (PP 1) and the second polypropylene (PP2) as described above.

The present invention is highly suitable for instance for applications where the production of the end article involves a shear rate above 100 sec$^{-1}$, in solid state or in melt. As non-limiting examples, films, preferably oriented films, like biaxially oriented polypropylene (BOPP) films, and fibers are mentioned.

According to one embodiment of the present invention, said article is a film, preferably a biaxially oriented polypropylene (BOPP) film comprising one or more layer(s), wherein at least one layer comprises the polypropylene composition (C).

Said at least one layer of the film of the invention comprises at least 60 wt.-%, more preferably at least 80 wt.-%, yet more preferably at least 95 wt.-%. Preferably the at least one layer of the film consists of the inventive polypropylene composition (C) as defined above.

Accordingly the film can be a monolayer film or a multilayer film, preferably a biaxially oriented monolayer or multilayer film (BOPP film). Most preferably the film is a biaxially oriented monolayer BOPP film, wherein said monolayer comprises, preferably consists of the inventive polypropylene composition (C).

The biaxially oriented polypropylene film can be prepared by conventional stretching (drawing) processes known in the art using the conventional equipment for producing the biaxially oriented polypropylene film. Typically, a cast film is prepared first by extrusion of polypropylene pellets. The thickness of the "starting" cast film depends on the desired BOPP film application and can be easily chosen by a skilled person in the art. As an example only: a biaxially oriented polypropylene film is typically stretched with a stretching ratio in machine direction (MD) of 3 to 7, like 4 to 6, and in transversal direction (TD) of 5 to 10, like 6 to 9. For example for producing BOPP film with thickness of 20 μm the starting thickness is e.g. 800 μm and the stretching ratio is of 5 in MD and 8 in TD at a stretching speed of 10 mm/s.

Preferably the final thickness of the BOPP film, preferably of the BOPP monolayer film, is of 10 to 70 μm, more preferably of 10 to 50 μm, still more preferably of 10 to 40 μm, yet more preferably of 15 to 35 μm.

The BOPP film of the invention can be used for various end applications, for instance for various packaging, like food or goods packaging, over-wrapping, or electrical, like capacitor film, applications, without limiting thereto. BOPP film can be used as it is or as part of a laminate or coated, like metallized, multilayer construction. It was found by the inventors that a polypropylene composition (C) comprising 80.0 to 99.5 wt.-%, preferably 80.0 to 97.95 wt.-%, more preferably 85.0 to 96.0 wt.-%, still more preferably 88.0 to 96.0 wt.-%, of the first polypropylene (PP 1) and 0.5 to 20.0 wt.-%, preferably 2.0 to 20.0 wt.-%, more preferably 3.0 to 15.0 wt.-%, still more preferably 3.0 to 12.0 wt.-% of the second polypropylene (PP2) is especially applicable for the preparation of biaxially oriented films at high production speeds.

According to another embodiment of the present invention, the article comprises fibers, preferably fibers produced by melt spinning, more preferably spunbonded fibers, comprising the inventive polypropylene composition (C). The spinning techniques, equipment, processes and process conditions are well known and documented in the literature and can be chosen by a skilled person depending on the desired end application of the fiber. Moreover, the dimensions of the fiber depend on the end application and can be chosen by a skilled person. As an example, the inventive fibers can be obtained by extruding the inventive polypropylene composition (C) through a spinneret.

Said fibers comprise at least 60 wt.-%, more preferably at least 80 wt.-%, yet more preferably at least 95 wt.-%, preferably consist of, the inventive polypropylene composition (C).

It was found that a polypropylene composition (C) comprising 80.0 to 99.5 wt.-% of the first polypropylene (PP1), and 0.5 to 20.0 wt.-% of the second polypropylene (PP2) is especially applicable for the preparation of spunbonded fibers at high production speed. Said fiber article is preferably selected from the group consisting of filtration medium (filter), diaper, sanitary napkin, panty liner, incontinence product for adults, protective clothing, surgical drape, surgical gown, and surgical wear.

The present invention will now be described in further detail by the examples provided below.

EXAMPLES

1. Measuring Methods

The following definitions of terms and determination methods apply for the above general description of the invention as well as to the below examples unless otherwise defined. $MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a hi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e]\ mol\ \%=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4:2003 and ASTM D 6474-99. A PolymerChar GPC instrument, equipped with infrared (IR) detector was used with 3×Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 3146/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_f$) are determined from the second heating step.

Density is measured according to ISO 1183-187. Sample preparation is done by compression moulding in accordance with ISO 1872-2:2007.

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

The amount of heptane solubles (C7) [in wt.-%] was determined via Soxhlet extraction. Around 1 g of a powdered test portion is carefully dried and weighed out exactly. The powdered test portion is extracted in a Soxhlet-apparatus with 150 ml n-heptane (p.a. quality) during 24 h. As thimble a standard 603 cellulose extraction thimble is used. To avoid that polymer powder will leave the extraction thimble it is closed on the top with another half cut thimble. The weight of the glass extractor including the polymer after extraction is weighed out after reaching constant weight. The mass of residue of the test portion in the glass extractor is determined in the following way:

$$C7\ solubles\ (\%))=((m2-mt))/m1\times100$$

with:
m1=original sample weight
m2=weight of the glass extractor with polymer after extraction
mt=weight of the glass extractor.

The amount of hexane solubles (C6) [in wt.-%] was determined via Soxhlet extraction. Around 1 g of a powdered test portion is carefully dried and weighed out exactly. The powdered test portion is extracted in a Soxhlet-apparatus with 150 ml n-hexane (p.a. quality) during 24 h. As thimble a standard 603 cellulose extraction thimble is used. To avoid that polymer powder will leave the extraction thimble it is closed on the top with another half cut thimble. The weight of the glass extractor including the polymer after extraction is weighed out after reaching constant weight. The mass of residue of the test portion in the glass extractor is determined in the following way:

C6 solubles (%))=((m2−mt))/m1×100 with:
m1=original sample weight
m2=weight of the glass extractor with polymer after extraction
mt=weight of the glass extractor.

Tensile modulus of the first polypropylene (PP1) was measured according to ISO 527-3 (cross head speed=1 mm/min; test speed 50 mm/min at 23° C.) using BOPP film (Stretching ratio of MD 5 and TD 7) with thickness of 20 μm. The measurement is done after 96 h conditioning time of the specimen.

Tensile modulus of the second polypropylene (PP2) was measured according to ISO 527 on injection-molded specimens.

B-Viscosity was determined according to ASTM D 3236 at 190° C.

B. Examples
1. The First Polypropylene (PP1):
The following commercial polypropylene material was used as the first polypropylene (PP1):
PP1a is the commercial polypropylene HC401BF by Borouge having a melt flow rate $MFR_2$ of 3.2 g/10 min, a melting temperature, Tm, of 162° C. and a density of 905 kg/m$^3$, and a tensile modulus (MD) of 2100 MPa when using 20 μm film samples.

2. The Second Polypropylene (PP2)
The following commercial polypropylene materials were used as the second polypropylene (PP2):
PP2a is the commercial polypropylene L-MODU S400 by Idemitsu.
PP2b is the commercial polypropylene L-MODU S600 by Idemitsu.
PP2c is the commercial polypropylene L-MODU S901 by Idemitsu.
The properties of the second polypropylene (PP2) materials are summarized in Table 1.

TABLE 1

Properties of the second polypropylene (PP2) sample

|  |  | PP2a | PP2b | PP2c |
| --- | --- | --- | --- | --- |
| MFR | [g/10 min] | 2000 | 350 | 50 |
| Tm | [° C.] | 79 | 82 | 83 |
| B-viscosity | [mPa · s] | 8,500 | 50,000 | 360,000 |
| Density | [kg/m$^3$] | 870 | 870 | 870 |
| Tensile modulus | [MPa] | 90 | 90 | 90 |
| $M_w$ | [kg/mol] | 45 | 75 | 130 |
| MWD | [Mw/Mn] | 2 | 2 | 2 |

Commercial reference is the commercial polypropylene HC402BF by Borouge suitable for stretching and having a melt flow rate $MFR_2$ of 3.2 g/10 min, a melting temperature Tm of 161° C., a density of 904 kg/m$^3$, a tensile modulus (MD) of 1900 MPa when using 20 μm film samples.

2. Preparation of the Polypropylene Composition (C)
The polypropylene compositions (C) were compounded on a ZSK18 twin screw extruder line at a screw speed pf 250 rpm, a SEI of 0.254 kwh/kg and a temperature profile of about 200° C.
The properties of the comparative and inventive compositions are summarized in Table 2.

TABLE 2

Composition and properties of the Commercial reference, comparative and inventive examples

|  |  | Ref | CE1 | IE1 | IE2 | IE3 |
| --- | --- | --- | --- | --- | --- | --- |
| Commercial reference | [wt.-%] | 100 |  |  |  |  |
| PP1a | [wt.-%] |  | 100 | 95 | 95 | 95 |
| PP2a | [wt.-%] |  |  | 5 |  |  |
| PP2b | [wt.-%] |  |  |  | 5 |  |
| PP2c | [wt.-%] |  |  |  |  | 5 |
| C7 solubles | [wt.-%] | 3.69 | 1.77 | 4.05 | 3.52 | 3.26 |
| C6 solubles | [wt.-%] | 1.92 | 0.55 | 1.47 | 1.32 | 0.93 |
| C7-C6 solubles | [wt.-%] | 1.77 | 1.22 | 2.58 | 2.20 | 2.33 |
| XCS | [wt.-%] | 4.0 | 1.1 | 3.7 | 3.0 | 3.0 |

As mentioned earlier, the value of C7-C6 as claimed indicates the stretchability and spinning performance of a polymer composition.

Accordingly, to evaluate the stretchability of films obtained from the inventive and comparative compositions, biaxially oriented films (BOPP films) are prepared from the compositions CE1 (PP1a alone) and IE1 to IE3 as follows using an conventional industrial full-scale BOPP film line:

The starting films of 800 μm of Ref, CE1 and IE1 to IE3 are stretched on at a stretching (draw) ratio of about 5 in machine direction (MD) and a stretching (draw) ratio of 8 in transversal direction (TD) at 10 mm/sec.

The 800 μm film based on CE1 (PP1 alone) ca of be stretched to obtain a final film thickness of 20 μm.

The 800 μm films based on IE1, IE2 and IE3 fulfilling the claimed relationship between heptane and hexane solubles can easily be stretched under the above mentioned conditions to obtain a final film thickness of 20 μm.

The invention claimed is:
1. A polypropylene composition (C), comprising
i) 80.0 to 99.5 wt.-%, based on the overall weight of the polypropylene composition (C), of a first polypropylene (PP1), and
ii) 0.5 to 20.0 wt.-%, based on the overall weight of the polypropylene composition (C), of a second polypropylene (PP2) which is a propylene homopolymer different from the first polypropylene (PP1) and has a melting temperature Tm of 130° C. or less,
wherein said first polypropylene (PP1) fulfils in-equation (I)

$$C7(PP1)-C6(PP1) \leq 1.5 \quad (I)$$

wherein
C7(PP1) is the amount of heptane solubles [in wt.-%] within the first polypropylene (PP1) and
C6(PP1) is the amount of hexane solubles [in wt.-%] within the first polypropylene (PP1), and
wherein the polypropylene composition (C) fulfils in-equation (II)

$$1.5 < [C7(C)-C6(C)] \leq 5.0 \quad (II)$$

wherein
C7(C) is the amount of heptane solubles [in wt.-%] within the polypropylene composition (C) and
C6(C) is the amount of hexane solubles [in wt. %] within polypropylene composition (C).

2. The polypropylene composition (C) according to claim 1, having a comonomer content in the range of 0.0 to 5.0 mol-%.

3. The polypropylene composition (C) according to claim 1, wherein the first polypropylene (PP1) is a propylene homopolymer (H-PP1) or a random propylene copolymer (R-PP1).

4. The polypropylene composition (C) according to claim 1, having a xylene soluble content (XCS) below 10.0 wt.-%.

5. The polypropylene composition (C) according to claim 1, wherein the second polypropylene (PP2) has a molecular weight distribution Mw/Mn in the range of 1.0 to 4.0.

6. The polypropylene composition (C) according to claim 1, wherein the second polypropylene (PP2) has a weight average molecular weight Mw in the range of 20 to 300 kg/mol.

7. The polypropylene composition (C) according to claim 1, wherein the second polypropylene (PP2) has a density below 895 kg/m$^3$.

8. The polypropylene composition (C) according to claim 1, wherein the second polypropylene (PP2) has a melting temperature Tm in the range of 50 to 125° C.

9. The polypropylene composition (C) according to claim 1, not comprising (a) further polymeric material different to the first polypropylene (PP1) and the second polypropylene (PP2) in an amount exceeding 5.0 wt.-%, based on the overall weight of the polypropylene composition (C).

10. An article comprising the polypropylene composition (C) according to claim 1.

11. The article according to claim 10, wherein said article is a film.

12. The article according to claim 11, wherein said film is a biaxially oriented film (BOPP).

13. The article according to claim 10, wherein said article is a fiber.

14. The article according to claim 13, wherein said fiber is a melt spun fiber or a spunbonded fiber.

* * * * *